Jan. 1, 1924     1,479,255
O. SALBACH
WHEEL TURNING LATHE
Filed Feb. 20, 1922

INVENTOR.
Otto Salbach
BY
ATTORNEY

Patented Jan. 1, 1924.

1,479,255

UNITED STATES PATENT OFFICE.

OTTO SALBACH, OF STOCKTON, CALIFORNIA.

WHEEL-TURNING LATHE.

Application filed February 20, 1922. Serial No. 537,768.

*To all whom it may concern:*

Be it known that I, OTTO SALBACH, a citizen of the United States, residing at Stockton, county of San Joaquin, State of California, have invented certain new and useful Improvements in Wheel-Turning Lathes; and I do declare the following to be a full, true, and exact description of the same, reference being had to the accompanying drawings, and to the characters of reference marked thereon, which form a part of this application.

This invention relates to improvements in lathes, and particularly to the work-holding part of the machine; the principal object being to provide a device whereby the wooden wheel of any motor vehicle may be accurately centered on the lathe spindle without any time-consuming adjustments being necessary to do so, and also firmly clamped against turning and held in a positive plane at right angles to the axis of the wheel.

This device is of particular value in wheel repair shops, which are called on to do any job from renewing a single spoke to practically reconstructing the entire wheel. In automobile-wheel construction, the steel felly-band or fixed rim, must fit over the wooden felly without the band being warped or sprung out of round, in this respect of course differing from the old time wagon wheels with which the felly band was first heated and then shrunk on and a variation in size or trueness of the wheel one way or another was not a serious matter.

In modern motor vehicle practice however care must be taken not only to have the felly a perfect circle (which is usually not the case after various spokes have been replaced) but to also have the felly perfectly concentric with the metal hub of the wheel.

Another object of my invention is to provide a holding device which may be used equally well for all diameters of wheel and hub, and all widths of the latter as well, with equal ease and efficiency.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figures 1, 2:
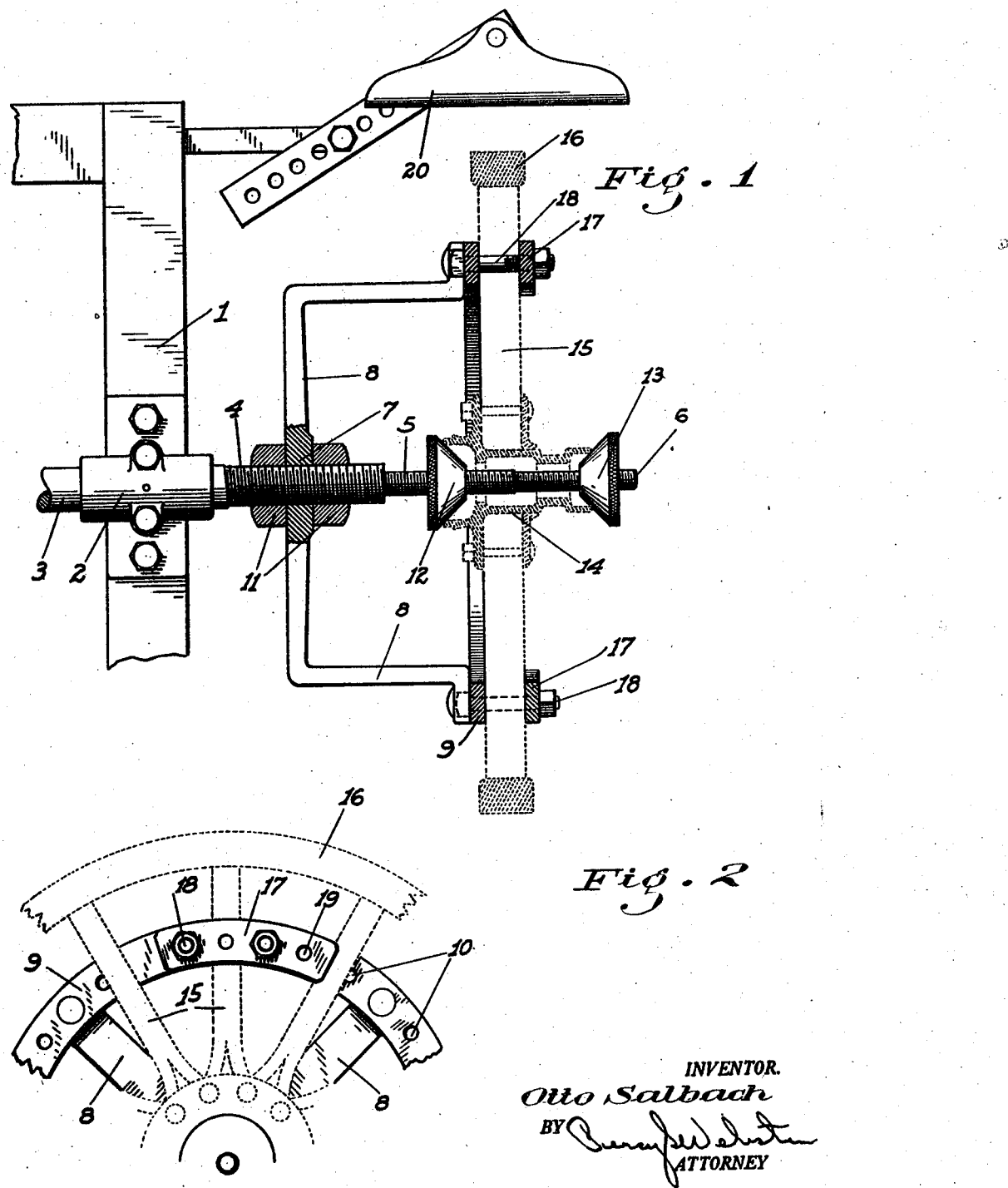
Fig. 1 is a top plan view of my improved structure, showing a wheel held thereby.
Fig. 2 is a fragmentary face view of the facing spider and one of the clamping plates used therewith, showing the same in connection with a portion of a wheel.

Referring now more particularly to the characters of reference on the drawings, the numeral 1 denotes the frame work of the lathe, in which is journaled in one or more boxes 2 a shaft 3, arranged to be driven at any desired speed by suitable and ordinary means, not shown.

Formed with the shaft 3 and projecting beyond the frame is a threaded portion 4, beyond which is another threaded portion 5 of smaller diameter, and beyond this still another threaded stem 6, of yet smaller size.

Turnably mounted on the stem 4 is a spider, comprising a hub 7, arms 8 and ring 9, the latter being concentric with the shaft and stems, extending in a plane at right angles to the latter, and being preferably machined on its face beyond the arms, the latter being bent a certain distance outwardly of the hub so as to bring the ring 9 within the longitudinal plane of the stem 5.

The spider ring is provided with holes 10 placed at fairly close intervals throughout its extent, and the spider itself is adapted to be clamped at any point by means of lock-nuts 11 on the stem 4 bearing against the hub 7 of the spider.

Adjustably screwed onto the stem 5 is a cone 12 tapering toward the stem in the direction away from the spider-hub, while similarly mounted on the stem 6 is a similarly but oppositely disposed cone 13.

In operation, the outer cone 13 is first removed, and the hub of the wheel to be worked on is slipped over the stems 5—6 until the inner end of the hub 14 of the wheel engages the cone 12. The cone 13 is then replaced on its stem, and screwed smartly against the outer end of the hub 14.

The spider is then turned by hand to bring its facing-ring snugly against the spokes 15 of the wheel, pressure being used if necessary to bring all the spokes into common alinement with this ring, which is of a size to lie inwardly of the wheel-felly 16. The lock nuts 11 are then tightened up, and the wheel is positively clamped to the spider by means of bars 17 placed outwardly of and across certain of the spokes and held in position by means of bolts 18 passing through certain ones of holes 19 in said bars and through corresponding ones of the holes 10.

This setting-up of the wheel is actually but the work of a minute or less, and turning operations may then be commenced if such be found necessary by a test.

To aid in the turning, which of course is done on the outer periphery of the felly, a form of adjustable tool-rest, such as is shown at 20, is provided, this member being mounted on the frame 1 and projecting therefrom.

The spider ring is of a size to fit inwardly of the felly of the smallest wheel made; the stems 5 and 6 are of a size to fit inside the inner and outer ends respectively of the smallest sized wheel-hubs; while the cones 12 and 13 are large enough to fit the largest sizes of such hubs as regards diameter, while they may also be separated enough to take the longest hubs made. The spider being adjustable independently of the cones, may of course be positioned to abut against the wheel-spokes irrespective of the extent of projection of the hub with respect thereto.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a wheel turning lathe, a driven shaft adapted to receive the hub of a wheel thereover from one end, opposed and adjustable cones mounted on the shaft and adapted to enter and engage the opposite ends of the hub and a spider adjustably mounted on the shaft and adapted to be clamped in any position thereon, said spider having a facing ring adapted to bear against the spokes of the wheel and to be clamped thereto.

2. In a wheel turning lathe, a driven shaft adapted to receive the hub of a wheel thereover from one end, means on the shaft and adapted to enter for engaging and centering the opposite ends of the hub, and a spider adjustably mounted on the shaft and adapted to be clamped in any position thereon, said spider having a facing ring adapted to bear against the spokes of the wheel and clamping plates for clamping certain of the spokes to the ring adapted to be removably secured in a plurality of positions on the latter, whereby the felly of the wheel is left in the clear for turning purposes.

In testimony whereof I affix my signature.

OTTO SALBACH.